(12) United States Patent
Lai

(10) Patent No.: US 8,318,273 B2
(45) Date of Patent: Nov. 27, 2012

(54) GLASSWARE STRUCTURE WITH METAL CLADDING

(75) Inventor: Ming-Hsiao Lai, Chang-Hua Hsien (TW)

(73) Assignee: Shenter Enterprise Co., Ltd., Chang-Hua Hsien (TW)

( * ) Notice: Subject to any disclaimer, the term of this patent is extended or adjusted under 35 U.S.C. 154(b) by 74 days.

(21) Appl. No.: 13/117,766

(22) Filed: May 27, 2011

(65) Prior Publication Data

US 2012/0045610 A1    Feb. 23, 2012

(30) Foreign Application Priority Data

Aug. 18, 2010  (TW) ................. 99215865 U

(51) Int. Cl.
*A47G 19/22* (2006.01)

(52) U.S. Cl. ........ 428/34.4; 362/253; 362/551; 362/101

(58) Field of Classification Search ................. 428/34.4, 428/195.1, 134, 138, 336; 362/253, 551, 362/101; 372/46.01
See application file for complete search history.

(56) References Cited

U.S. PATENT DOCUMENTS

| | | | | |
|---|---|---|---|---|
| 4,749,126 A | * | 6/1988 | Kessener et al. ................. 239/12 |
| D416,415 S | * | 11/1999 | Ming-Hsiao ................. D6/540 |
| D416,785 S | * | 11/1999 | Ming-Hsiao ................. D8/363 |
| D417,576 S | * | 12/1999 | Ming-Hsiao ................. D6/549 |
| 7,008,073 B2 | * | 3/2006 | Stuhlmacher, II ............. 362/96 |
| 7,434,960 B2 | * | 10/2008 | Stuhlmacher et al. ......... 362/253 |
| 8,123,967 B2 | * | 2/2012 | Anton et al. ..................... 216/40 |
| 8,247,050 B2 | * | 8/2012 | McCrea et al. ............. 428/35.8 |
| 2007/0026205 A1 | * | 2/2007 | Anton et al. ............... 428/195.1 |
| 2012/0045610 A1 | * | 2/2012 | Lai ............................... 428/134 |

* cited by examiner

*Primary Examiner* — N. Edwards
(74) *Attorney, Agent, or Firm* — Egbert Law Offices, PLLC

(57) ABSTRACT

A glassware structure with metal cladding for decorative effect having a main body and a metal cladding incorporated onto the surface of the main body by means of vacuum vapor deposition. The main body has an assembly portion and an acting portion. The metal cladding is distributed at least within the range of the acting portion. The tensile strength of the main body ranges between 120 and 200MPa (N/mm$^2$), the thickness of the metal cladding between 0.1 and 1.0μm, and the coverage ratio between 95% and 100%. The metal cladding material is selected from zirconium nitride, nickel nitride, molybdenum nitride, titanium nitride, chromium nitride and silicon nitride. As the metal cladding and the main body can be securely fixed, the present invention can be used instead of metal castings and tubes. The glassware produces light transmittance effect, improving shape design flexibility, novelty and value of the glassware.

8 Claims, 6 Drawing Sheets

GLASSWARE STRUCTURE WITH METAL CLADDING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a glassware structure, and more particularly to an innovative one which is designed with metal cladding for a decorative effect.

2. Description of Related Art Including Information Disclosed Under 37 CFR 1.97 and 37 CFR 1.98.

Many currently available products are generally provided with a metal cladding to create aesthetically pleasing texture and top-quality attributes. For instance, sanitary wares (e.g.: hangers, hanger joints, handles, main bodies and seats of faucets) are extensively coated with said metal cladding for intended surface texture.

As common products with a metal cladding are concerned, the substrate is generally made of metal tubes or castings. Yet, the following shortcomings are observed during actual applications:

Endurance: since sanitary wares are often used in the operating environment of high humidity, the metal cladding is vulnerable to corrosion arising from moisture infiltration into the metal substrate, resulting in rapid peeling and non-durability of the metal cladding.

Material cost: the consumption of relevant metal products is doubled with the rising cost of metal materials in the international market, reducing greatly the profit margin of the manufacturers and bringing about more cost burden against the customers. Hence, a great concern in this industry is how to save costs while maintaining the product performance.

Design flexibility of the product pattern: common products with a metal cladding could produce a metallic glossy texture, however this makes it difficult to increase varied and brand new surface texture.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the unique construction of the present invention wherein "the glassware structure with metal cladding for decorative effect" mainly comprises a main body and a metal cladding incorporated onto the surface of the main body by means of vacuum vapor deposition, the tensile strength of the main body ranges between 120 and 200 MPa (N/mm$^2$), the thickness of the metal cladding between 0.1 and 1.0 μm, and the coverage ratio between 95% and 100%, and the material is selected from either of zirconium nitride, nickel nitride, molybdenum nitride, titanium nitride, chromium nitride and silicon nitride, so the metal cladding and the main body of the present invention can be securely fixed with currently feasible vacuum film-coating equipments and technologies. As compared with the prior art, the metal cladding of the present invention has advantages such as stronger resistance to rust, acid/alkali and high temperature as well as excellent robustness. Moreover, with the reinforced structural design of the main body, the present invention can be used instead of metal castings and tubes so as to save manufacturing cost for better economic benefits.

Another technical feature of the present invention lies in that the unique glassware comprises hollow portions, a luminous element is set within the main body, and the light from the highlighted luminous element can be emitted from the hollow portions. So the glassware of the present invention can be used in a manner that, with the shape of the hollow portion and lighting design of the luminous element, the glassware could produce metallic glossy texture and light transmittance effect, thus improving markedly the shape design flexibility as well as the novelty and value of the glassware.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
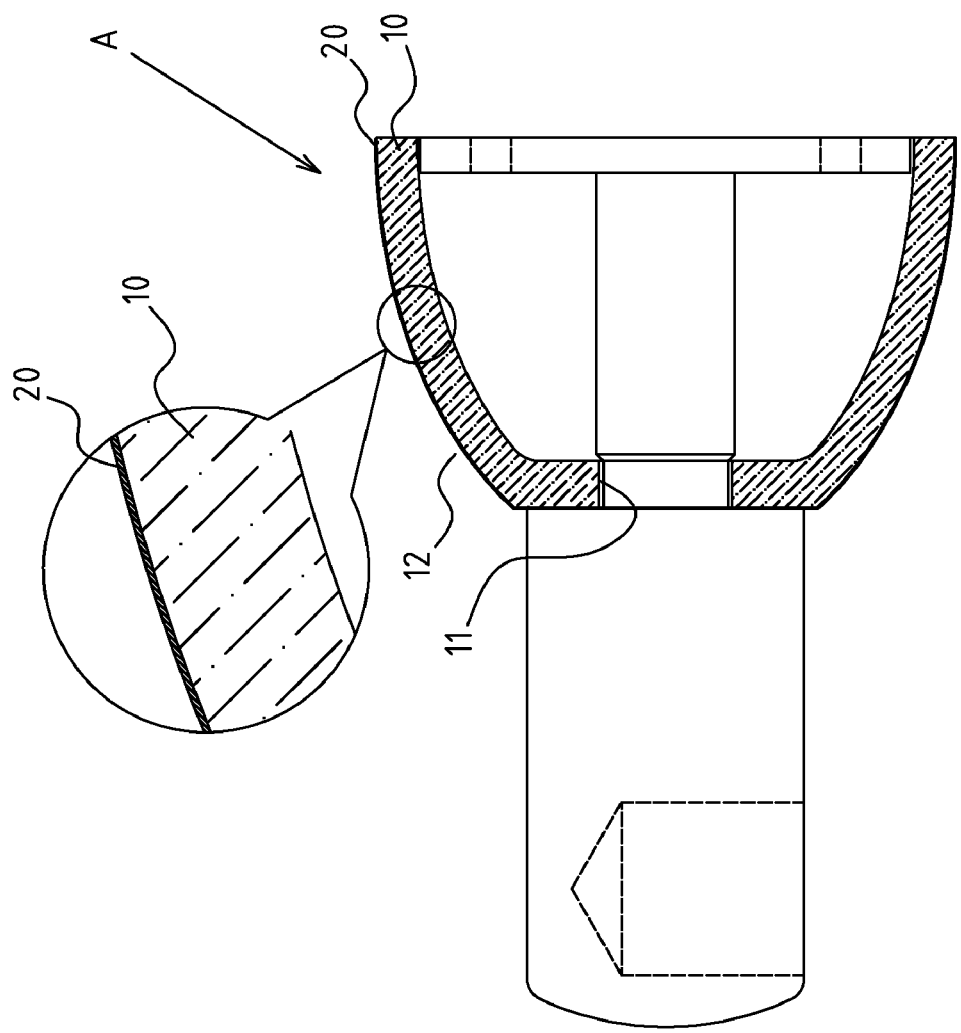
FIG. 1 is a sectional view of the first preferred embodiment of the glassware of the present invention.

FIG. 1 depicts a preferred embodiment of a glassware structure of the present invention with metal cladding for decorative effect, which, however, is provided for only explanatory objective for patent claims. Said glassware A comprises: a main body 10 and a metal cladding 20 incorporated onto the surface of the main body 10 by means of vacuum vapor deposition (e.g.: physical or chemical vapor deposition). Of which, the main body 10 comprises an assembly portion 11 and an acting portion 12. Said metal cladding 20 is distributed at least within the range of the acting portion 12, and the specific pattern of the acting portion 12 depends on the functionality of the glassware A, of which:

the tensile strength of the main body 10 ranges between 120 and 200 MPa (N/mm$^2$), i.e.: construction level of reinforced glass;

the thickness of the metal cladding 20 ranges between 0.1 and 1.0 µm;

the coverage ratio of the metal cladding 20 ranges between 95% and 100%;

the metal cladding 20 is made of either of zirconium nitride, nickel nitride, molybdenum nitride, titanium nitride, chromium nitride and silicon nitride.

The coupling surface of the main body 10 for the metal cladding 20 is of a smooth or rough type. Namely, the metal cladding 20 could be designed with a smooth (or specular) surface or rough (or sand-finished, matted) surface.

Figure 2:
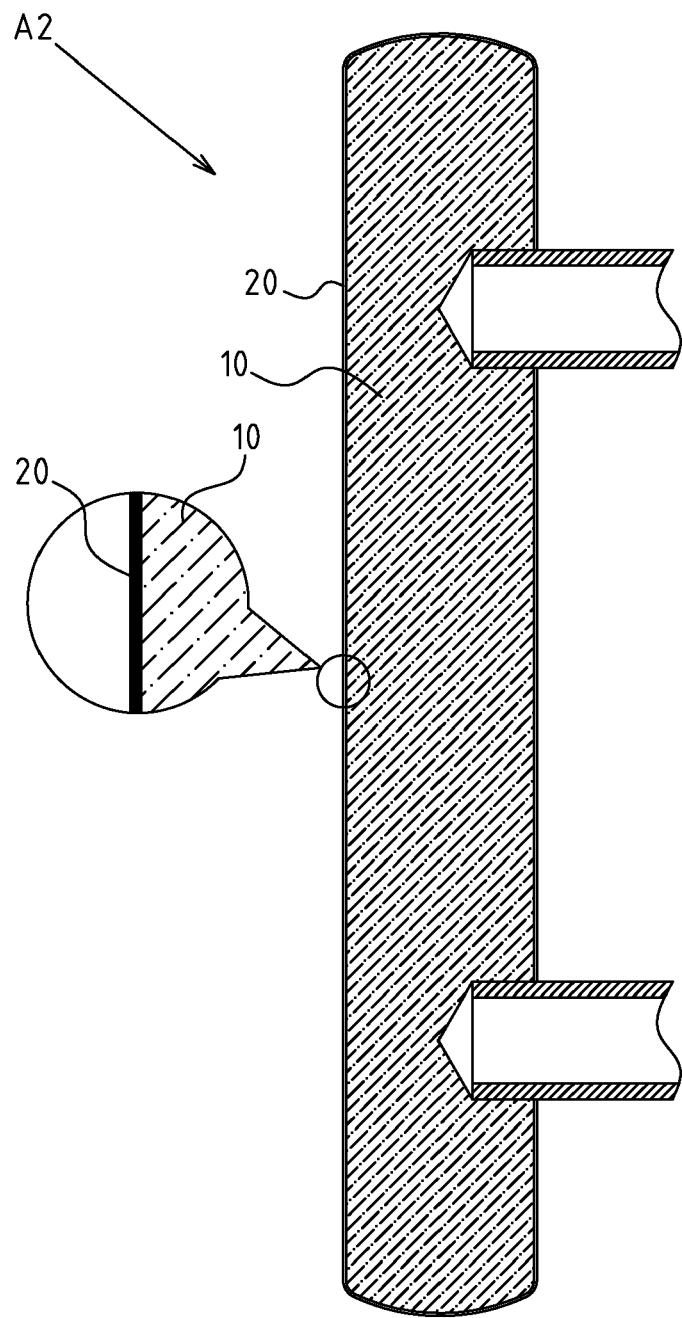
FIG. 2 is a sectional view of the second preferred embodiment of the glassware of the present invention.
Figure 5:
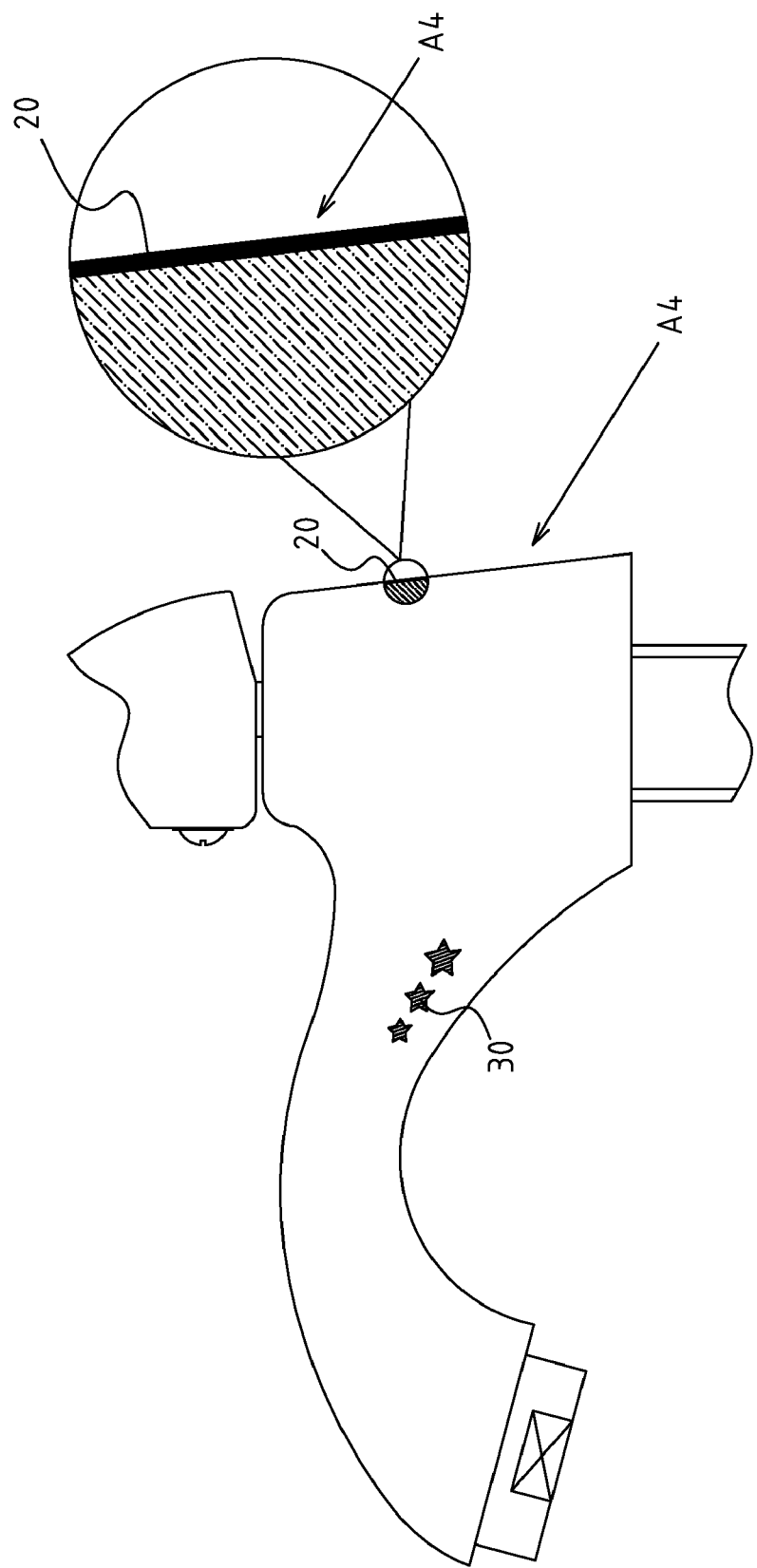
FIG. 5 is a plan view, partially sectional and enlarged, of the fourth preferred embodiment of the glassware of the present invention.
Figure 6:
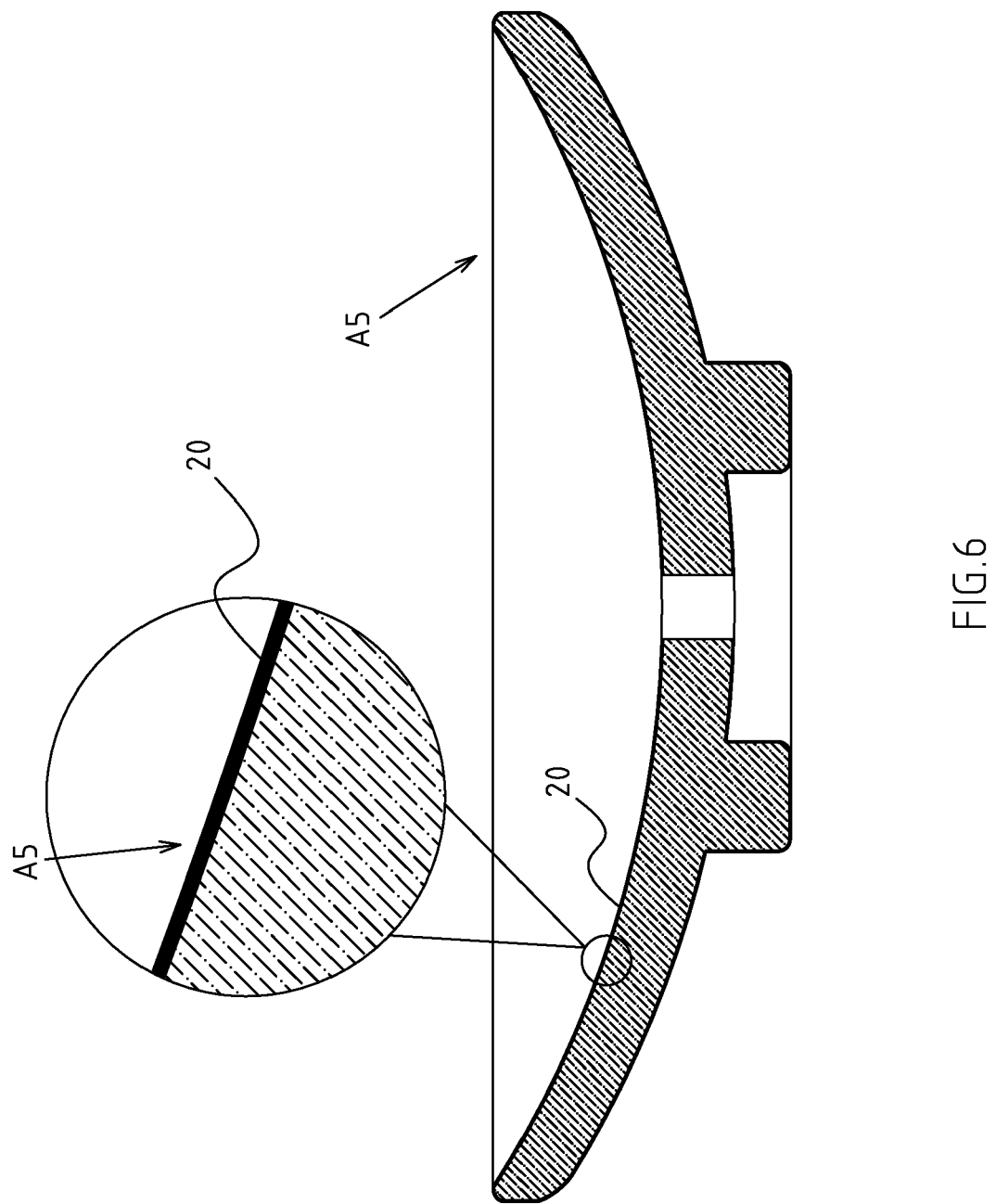
FIG. 6 is a plan view partially sectional and enlarged, of the fifth preferred embodiment of the glassware of the present invention.

Of which, said glassware A functionally comprises a hanger, hanger joint, handle, main body and seat of faucet as well as a soap dish. Referring to FIG. 1, said glassware A is the shell part of a hanger joint. Referring also to FIG. 2, said glassware A2 is a handle. Referring also to FIG. 5, said glassware A4 is a main body of faucet. Referring also to FIG. 6, said glassware A5 is a soap dish.

Figure 3:
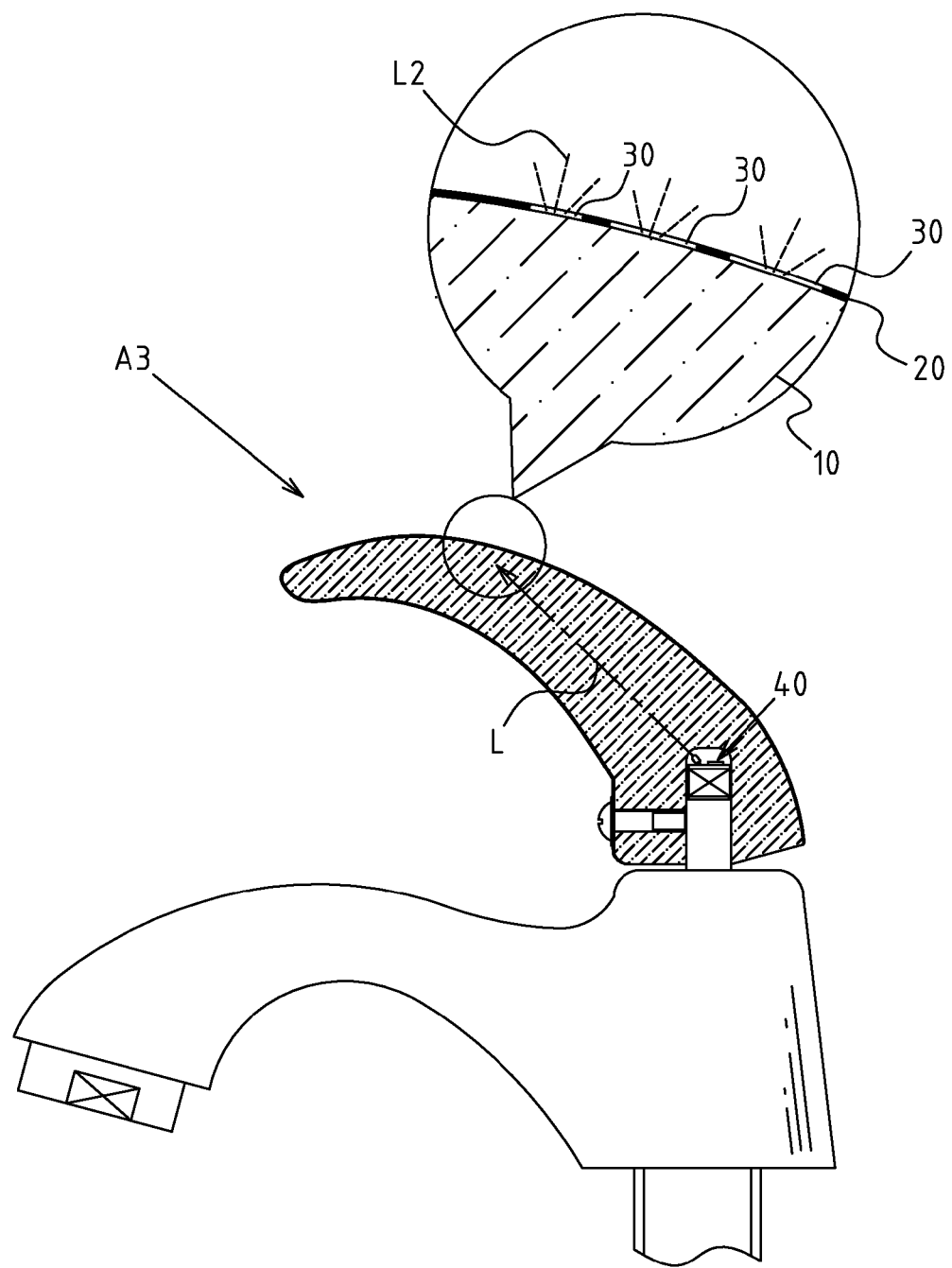
FIG. 3 is a sectional view of the third preferred embodiment of the glassware of the present invention.
Figure 4:
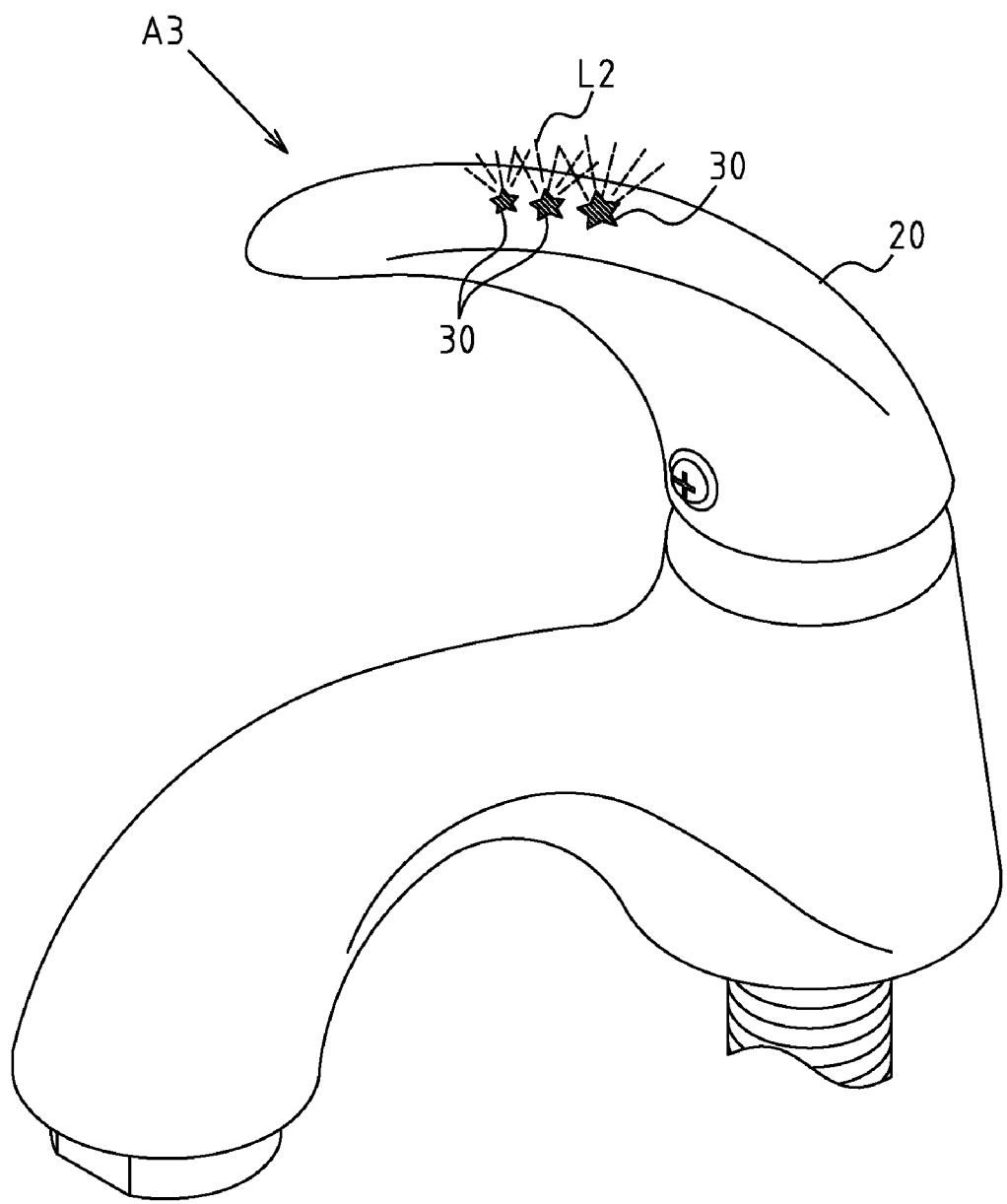
FIG. 4 is a 3D view of the third preferred embodiment of the glassware of the present invention.

Referring also to FIGS. 3 and 4, another preferred embodiment of the glassware structure of the present invention with metal cladding for decorative effect, wherein the difference lies in that said glassware A3 (a faucet handle) comprises of at least a hollow portion 30, which is formed through partial non-film coating of the metal cladding 20, enabling one to observe visually the status of the main body 10. Moreover, at least a luminous element 40 is set within the main body 10 (an LED module shown in FIG. 3). The light L from the highlighted luminous element 40 can be emitted from the hollow portion 30 (marked by L2 in FIGS. 3, 4). The power supply and startup modes of said luminous element 40 are not limited herein.

The hollow portion 30 can be designed into either of geometrical (e.g.: round, triangular, polygonal and star), irregular or mimetic shapes (e.g.: characters, animals and plants) or literal forms.

The main body 10 is made of colorless or colored glass. With the construction of the hollow portion 30 and color fitness of the metal cladding 20, it is possible to realize diversified styles of matched color or hue contrast, so as to meet the demanding requirements of the customers.

I claim:

1. A glassware structure with metal cladding for decorative effect comprising:
   a main body; and
   a metal cladding incorporated onto a surface of the main body by means of vacuum vapor deposition;
   of which, the main body comprises an assembly portion and an acting portion; said metal cladding is distributed at least within the range of an acting portion;
   the tensile strength of the main body ranges between 120 and 200 MPa (N/mm$^2$);
   the thickness of the metal cladding ranges between 0.1 and 1.0 µm;
   the coverage ratio of the metal cladding ranges between 95% and 100%;
   the material of the metal cladding is selected from either of zirconium nitride, nickel nitride, molybdenum nitride, titanium nitride, chromium nitride and silicon nitride.

2. The structure defined in claim 1, wherein the coupling surface of the main body for the metal cladding is of a smooth or rough type.

3. The structure defined in claim 1, wherein said glassware comprises a hanger, hanger joint, handle, main body and seat of faucet as well as soap dish.

4. A glassware structure with metal cladding for decorative effect comprising:
   a main body; and
   a metal cladding incorporated onto a surface of the main body by means of vacuum vapor deposition;
   of which, the main body comprises an assembly portion and an acting portion; said metal cladding is distributed at least within the range of an acting portion;
   the tensile strength of the main body ranges between 120 and 200 MPa (N/mm$^2$);
   the thickness of the metal cladding ranges between 0.1 and 1.0 µm;
   the coverage ratio of the metal cladding ranges between 95% and 100%;
   the material of the metal cladding is selected from either of zirconium nitride, nickel nitride, molybdenum nitride, titanium nitride, chromium nitride and silicon nitride;
   at least a hollow portion, which is formed through partial non-film coating of the metal cladding, enabling to observe visually the status of the main body;
   at least a luminous element, set within the main body; the light from the highlighted luminous element can be emitted from the hollow portion.

5. The structure defined in claim 4, wherein the coupling surface of the main body for the metal cladding is of a smooth or rough type.

6. The structure defined in claim 4, wherein said glassware comprises a hanger, hanger joint, handle, main body and seat of faucet as well as soap dish.

7. The structure defined in claim 4, wherein the hollow portion can be geometrical, irregular or mimetic shapes or literal forms.

8. The structure defined in claim 4, wherein said main body is made of colorless or colored glass.

* * * * *